Aug. 17, 1926.
1,596,333
F. BOYLE
POULTRY FEEDER
Filed March 16, 1925
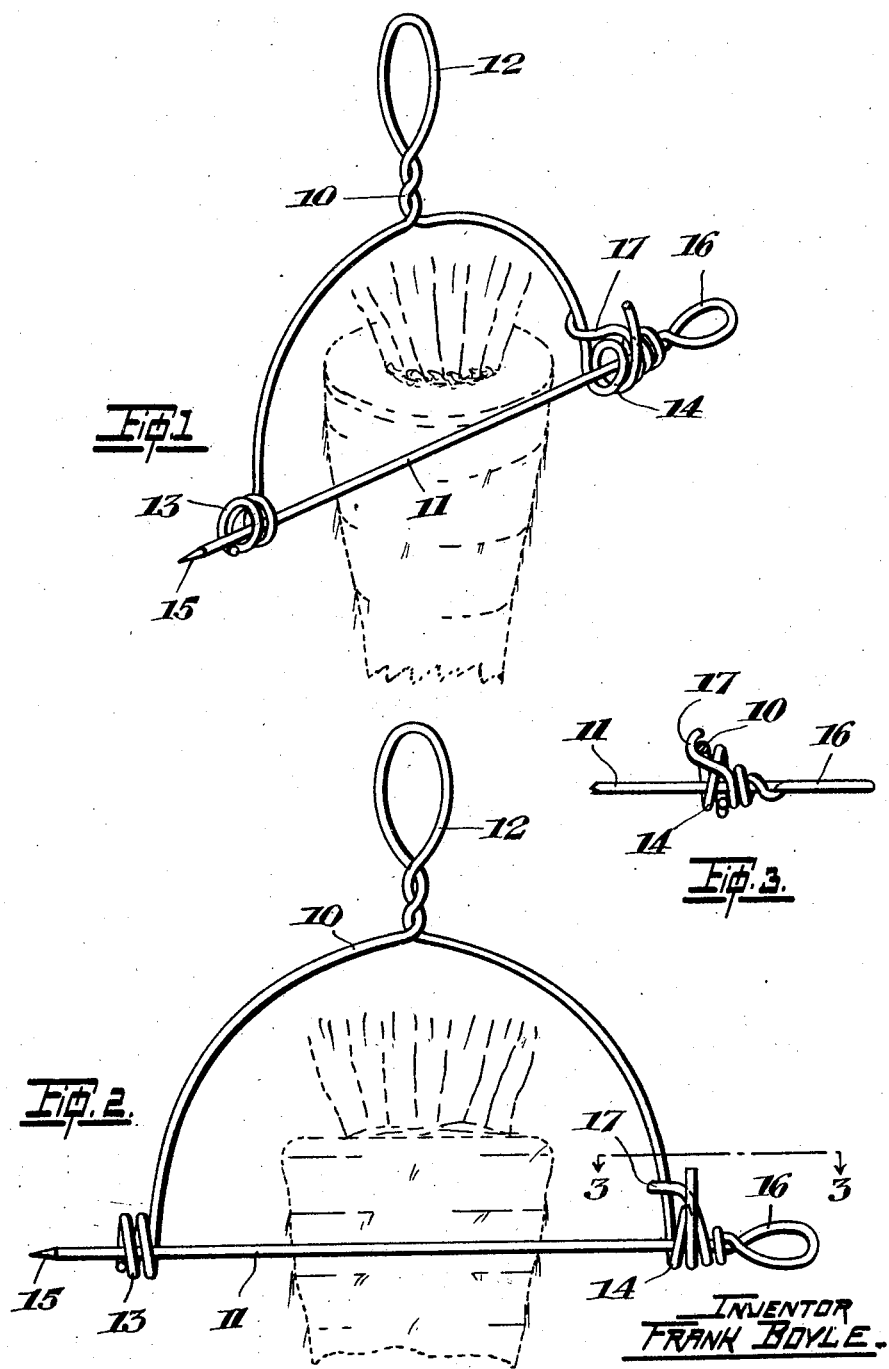
INVENTOR
FRANK BOYLE.
BY Fetherstonhaugh Co.
ATTYS.

Patented Aug. 17, 1926.

1,596,333

UNITED STATES PATENT OFFICE.

FRANK BOYLE, OF OTTAWA, ONTARIO, CANADA.

POULTRY FEEDER.

Application filed March 16, 1925, Serial No. 16,034, and in Canada February 27, 1925.

This invention relates to improvements in poultry feeders, and the objects of the invention are to provide a simply constructed and efficient device of this character adapted to be suspended in a poultry run and to carry root feed for the poultry.

Further objects are the provision of the device of this description, which can be readily hung up in a poultry run and adapted to securely carry a mangold, turnip or other suitable root food for chickens or the like, and whereby the latter is suspended in such a way that the chickens have to jump at it to reach it, thus attaining particularly in winter, healthy exercise.

Still further objects is the provision of the simply constructed and durable device of this character that can be made in large quantities and placed on the market at a very low price.

With the foregoing and other objects in view, the invention consists essentially of a suspension member and a food carrying member adapted to detachably and rigidly engage with the suspension member and to carry thereon a root, such as a mangold, turnip or the like.

Referring now to the drawings, in which like characters of reference indicate corresponding parts in all the figures, Figure 1 is a perspective view of my improved poultry feeder with dotted lines showing the mangold root carried thereby.

Figure 2 is a front elevation.

Figure 3 is a section on line 3—3 of Figure 2.

Referring now more particularly to the drawings, the device as a whole, as illustrated in Figure 1 comprises two members, a suspension member 10 and a food carrying or supporting member 11. The suspension member 10 is formed from a single length of wire or the like, bent as here shown in semi-circular form and twisted substantially midway of its length to form a looped handle 12, whereby the member 10 can be suspended and carried about.

The loose ends of the suspension member are twisted to form double loops or eyes 13 and 14 adapted to detachably engage with the supporting member 11 in the form of a rod or pin pointed at 15, and formed of a single piece of wire or the like, the other loose end being twisted on itself to form a loop or handle 16, and a bent or hooked extremity or extension 17 adapted as illustrated in Figure 3 to engage with the member 10 on the handle 16 being operated to turn the member 11.

On this food carrying member 11 as shown in dotted lines in Figures 1 and 2, is a root pierced and carried by said member for chickens or the like to pick at and feed from.

When it is desired to detach the member 11 from the member 10, it is only necessary to turn the handle 16 disengaging the extremity or bent loose end 17 from the member 10 and drawing out the member 11 from engagement with the loops 13 and 14. The member 10 being suspended by means of the loop 12, will, on the root or the like carried by the member 11 being picked at swing backwards and forwards, thus entailing exercise on the part of the poultry wanting to feed from it.

As many changes could be made in the above construction, and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:

A swingingly suspendible food carrier for poultry runs and the like, including a single length of wire bent in semi-circular form and intermediately twisted to form a centre suspending eye, one loose end of the wire being twisted twice to form a double eyelet, the other loose end being twisted twice and then extended vertically to form a second double eyelet and an upwardly protruding engaging element, a flexible rod adapted to engage with said eyelets and formed with a point in one end, the other end being bent to form an apertured handle portion and then twisted on itself and extended in bent form to engage and dis-engage with the semi-circular portion of the bent wire and with the engaging element of said wire, respectively, whereby the rod is locked in position in the suspended wire portion and whereby, on the rod being turned, it is unlocked.

In witness whereof I have hereunto set my hand.

FRANK BOYLE.